May 5, 1942.    B. DE H. MILLER ET AL    2,281,944
PROCESSING APPARATUS
Filed Dec. 6, 1939    3 Sheets-Sheet 1
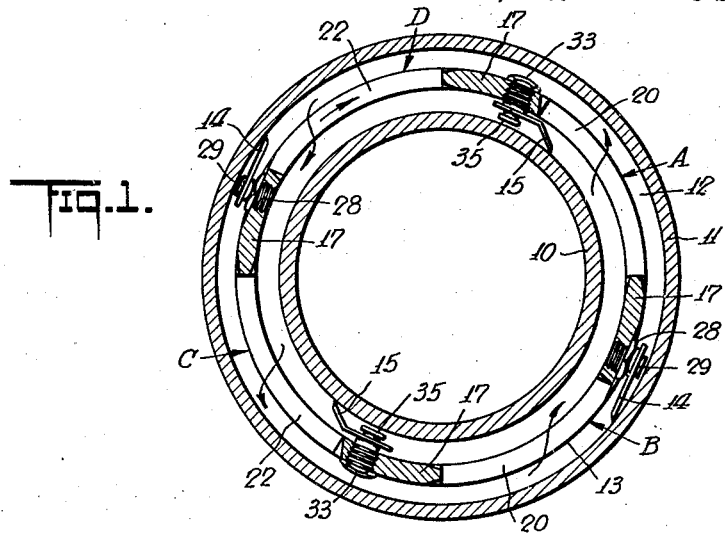
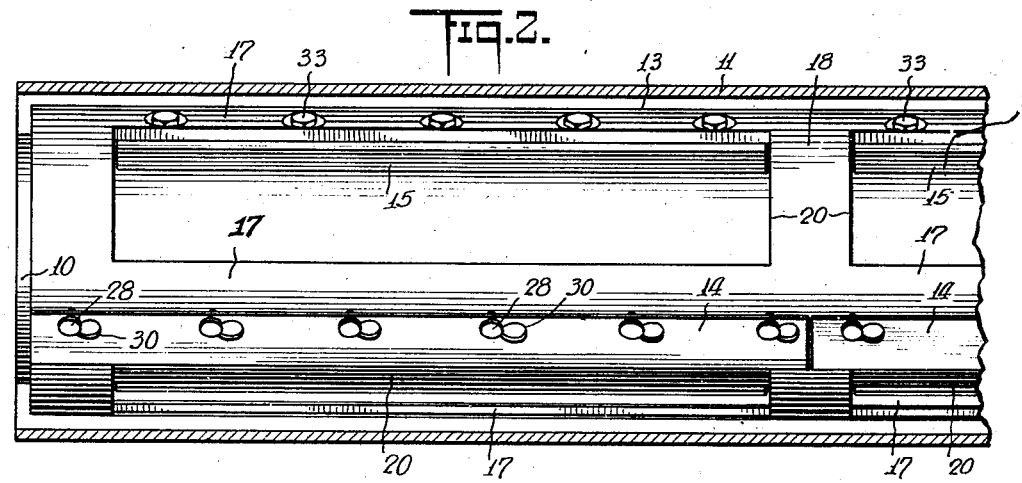
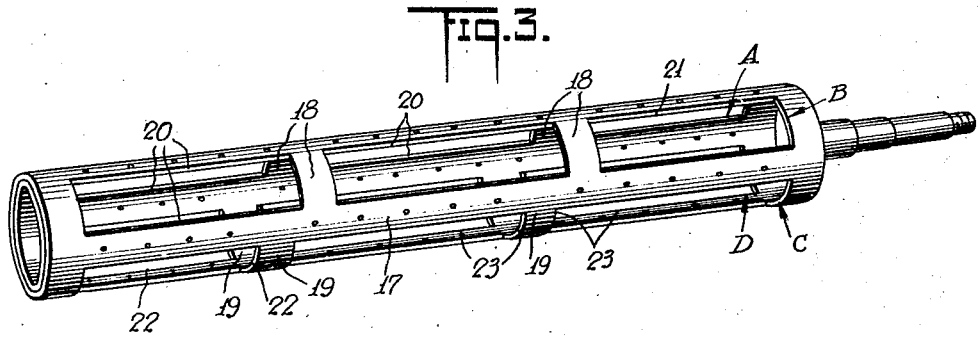
INVENTORS
Bruce DeHaven Miller
Henry W. Beverly
BY
Dean Fairbank & Hirsch
ATTORNEYS May 5, 1942.   B. DE H. MILLER ET AL   2,281,944
PROCESSING APPARATUS
Filed Dec. 6, 1939   3 Sheets-Sheet 2
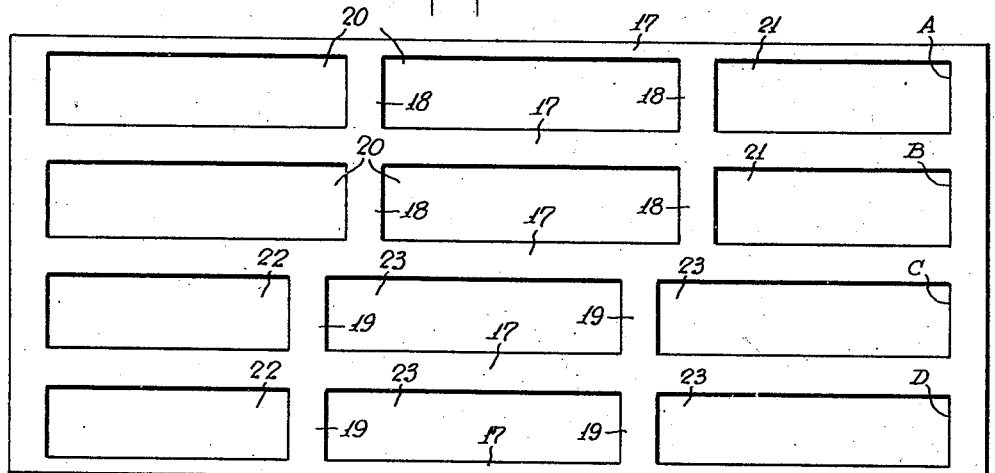
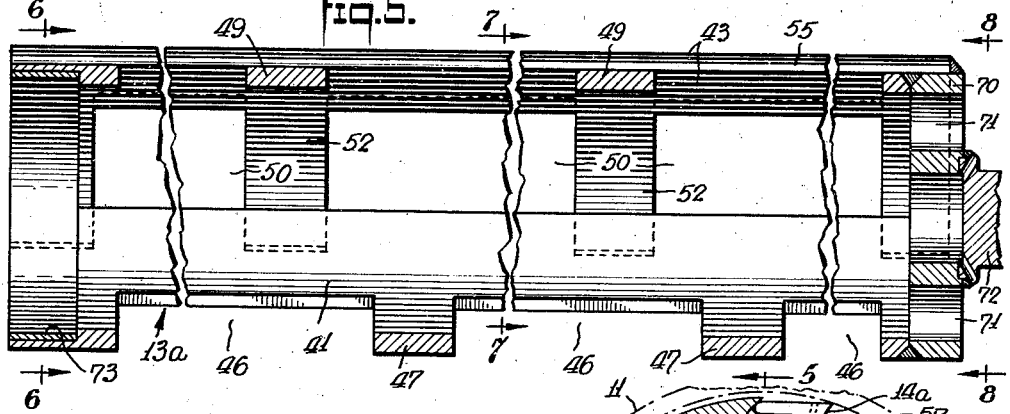
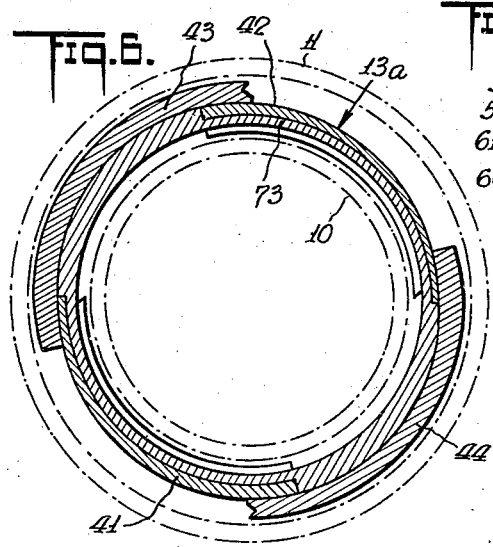
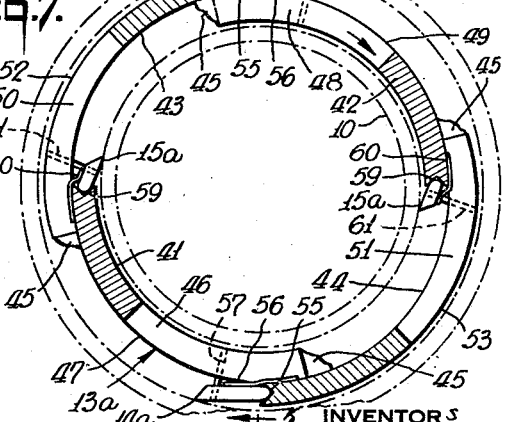

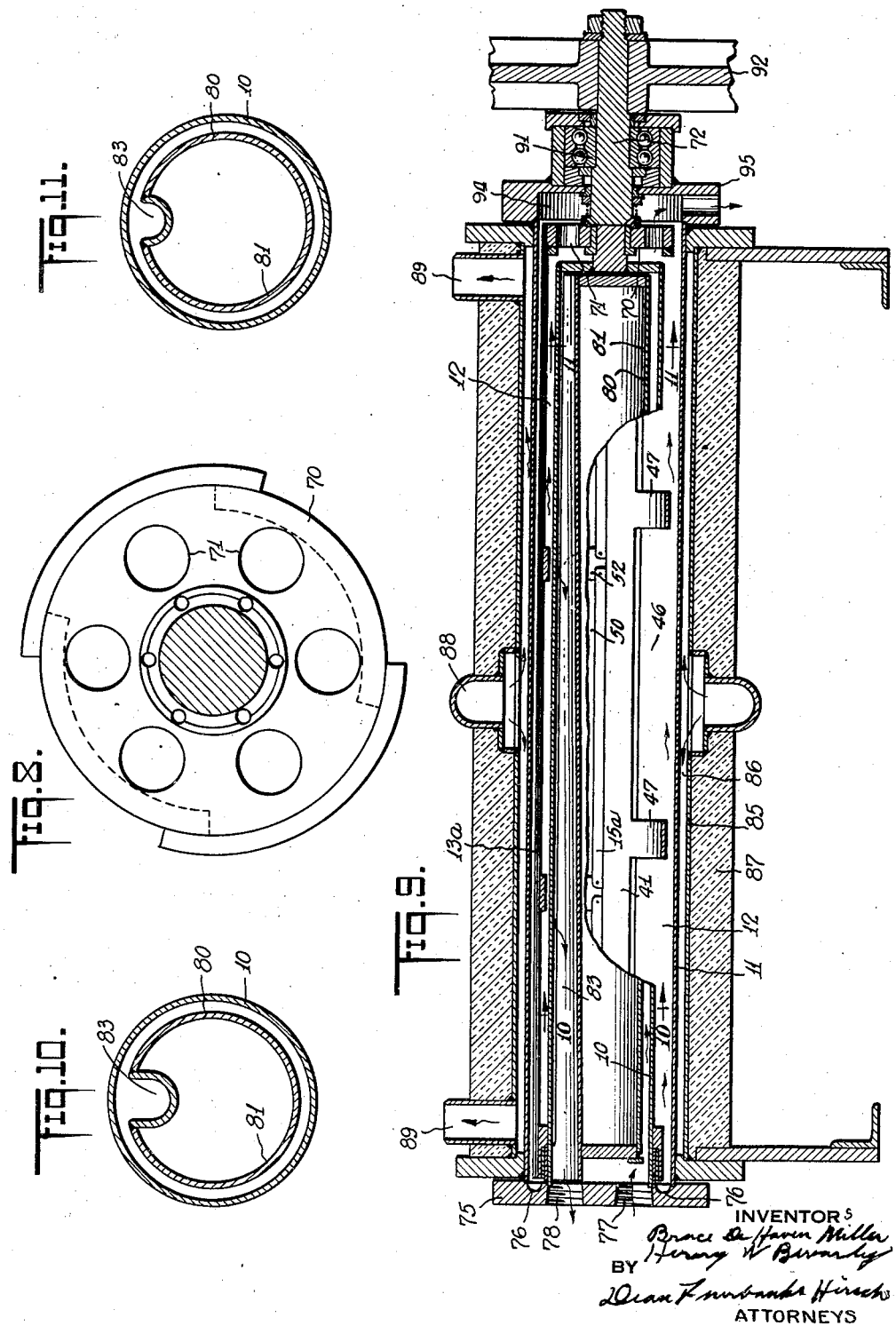

Patented May 5, 1942

2,281,944

UNITED STATES PATENT OFFICE 2,281,944

PROCESSING APPARATUS

Bruce De Haven Miller and Henry W. Beverly, Louisville, Ky., assignors to The Girdler Corporation, Louisville, Ky., a corporation of Delaware

REISSUED
JUL 18 1944

Application December 6, 1939, Serial No. 307,778

16 Claims. (Cl. 62—114)

The present invention relates to an apparatus for refrigerating liquids or semi-plastic materials, and is particularly useful in the preparation of paraffines, soaps, waxes, oils, fats, lard, margarine, greases, ice cream and the like.

One object of the present invention is to provide a new and improved refrigerating apparatus of the character described for effecting efficient uniform cooling and intimate uniform intermixing or agitation of the material processed therein.

Another object is to provide a refrigerating apparatus of the character described, in which the material being processed is caused to take a zigzag path back and forth between two refrigerated surfaces.

As a feature of the present invention, the refrigerating apparatus is provided with internal and external refrigerated drums forming an annular refrigerating chamber therebetween, and a ported hollow shaft in said chamber carrying scrapers arranged to scrape the frozen material from the surfaces of both drums, and direct it in and out through the ports in said shaft and alternately against said surfaces. With this construction, a uniform processing of the material takes place, and none of it is permitted to short circuit through the apparatus as is the case with some types of continuous freezers, or to collect in regions remote from the refrigerated surfaces.

Various other objects, features and advantages of the invention will be apparent from the following description, and from an inspection of the accompanying drawings, in which:

Fig. 1 is a transverse section through one form of refrigerating apparatus embodying the present invention, and shows the ported shaft extending between inner and outer refrigerated drums, and carrying scrapers, Fig. 2 shows an end portion of the assembly of Fig. 1, the outer refrigerated drum being in longitudinal section and the other parts in side elevation, Fig. 3 is a perspective of the ported shaft without the scrapers, Fig. 4 is a development of the shaft of Figs. 1, 2 and 3.

Fig. 5 is a longitudinal section through another form of ported shaft embodying the present invention, and shown without the scrapers, Fig. 6 is a transverse section taken on line 6—6 of Fig. 5, and showing the inner and outer refrigerated drums in dot and dash lines, Fig. 7 is a transverse section taken on line 7—7 of Fig. 5, but showing the scrapers mounted in position, and showing the inner and outer refrigerated drums in dot and dash lines, Fig. 8 is a transverse end section taken on line 8—8 of Fig. 5, Fig. 9 is a longitudinal section through a complete machine, portions being broken away to show therein a ported shaft of the type shown in Figs. 5 to 8, and Figs. 10 and 11 are transverse sections taken on lines 10—10 and 11—11 of Fig. 9 respectively.

Referring to Figs. 1 to 4, the refrigerating apparatus comprises a pair of stationary concentric cylindrical refrigerated drums 10 and 11, forming an annular chamber 12 therebetween for the material to be processed, and refrigerated internally and externally respectively by suitable refrigerant. Extending in this processing chamber 12 concentric with the refrigerated drums 10 and 11 is a hollow agitator or mutator shaft 13, carrying on its outer side a pair of diametrically opposed sets of scrapers 14, which engage the inner refrigerated surface of the outer drum 11, and on its inner side a pair of diametrically opposed sets of scrapers 15, substantially in quadrant relationship with said scrapers 14, and engaging the outer refrigerated surface of the inner drum 10.

The shaft 13 is provided with a series of ports so arranged with respect to the scrapers 14 and 15 that the material scraped from the refrigerated surfaces of the drums 10 and 11 is zigzagged in and out of said ports and between said surfaces as said shaft is rotated. For that purpose, the shaft 13 has a plurality of ports 20, 21, 22 and 23, arranged in longitudinal rows corresponding in number to the sets of scrapers, four of such rows A, B, C and D being shown equally spaced circumferentially of the shaft by longitudinal webs 17. Each longitudinal row comprises a plurality of ports, three being shown of rectangular elongated form arranged end to end and separated by circumferential webs 18 and 19. In order to prevent the material from quiescently collecting in the processing chamber 12 adjacent these webs, and to assure the scraping action of the scrapers 14 and 15 along the entire refrigerated surfaces of the drums 10 and 11, as will be more fully described, the ports of alternate rows are staggered with respect to each other. For that purpose, the two rows A and B are exact duplicates, and each includes two successive ports 20 of equal length, and a third shorter port 21, and the rows C and D are exact duplicates and each comprises a port 22 similar to the ports 21, and two successive longer ports 23 similar to the ports 20. With this construction, the outer ends of the ports near the ends of the shaft 13 are in circumferential alignment, while the webs 18 between the ports of the two rows A and B are staggered with respect to the webs 19 between the ports of the two rows C and D.

The outer scrapers 14 are shown mounted adjacent to the alternate port rows B and D in position to direct the flow of the material scraped by said scrapers from the refrigerated surface of the outer drum 11 radially inwardly through the ports of said rows and towards the refrigerated surface of the inner drum 10. For so mounting the outer scrapers 14, the webs 17 over the port rows B and D have threaded or otherwise secured thereto a series of screw pins 28 provided with heads 29, and the scrapers 14 have elongated slots 30 with enlarged sections to fit loosely over said heads 29, and reduced sections for snugly engaging said heads 29 upon endwise slide movement of the scrapers. The loose mounting of these scrapers 14 permits them to swing outwardly into engagement with the refrigerated surface of the outer drum by the centrifugal action on said scrapers.

Each set of scrapers 14 comprises a plurality of blades arranged end to end with adjacent ends of successive blades extending almost to the center of the circumferential webs 18 or 19, and almost abutting as shown in Fig. 2, so that substantially the full length of the refrigerated surface of the outer drum 11 is acted upon by these blades.

The inside scrapers 15 are supported adjacent to the alternate port rows A and C in position to direct the flow of material scraped by said scrapers from the refrigerated surface of the inner drum 10 radially outwardly through said ports of said rows and towards the refrigerated surface of the outer drum 11. For that purpose, the scrapers are supported on screw pins 33, threaded in alternate longitudinal webs 17 of the shaft 13 between port rows A and D and between rows B and C, and provided at their inner ends with flange heads 35. The scraper blades 15 have transversely elongated slots with portions large enough to pass over the flange heads 35 and with portions smaller than said heads to retain said scrapers, and are just slightly shorter than the corresponding ports adjacent to which they are mounted, so that these blades can be easily mounted from the outside of the shaft 13 by slipping them through said ports to the inside of said shaft, and then over the screw pins 33. Lateral movement of the blades 15 will then bring the reduced portions of the elongated slots thereon around the pins 33.

In the operation of the device shown in Figs. 1 to 4, the material as it is scraped by the outer blades 14 from the inner periphery of the outer drum 11 is directed by their camming action radially inwardly through the adjacent port and towards the outer surface of the inner drum 10, as shown in Fig. 1. As the next successive inner scraper blades 15 move along the region of the inner drum 10 toward which the previously scraped material from the outer drum 11 has been directed, they scrape that material and direct it radially outwardly by their camming action through the corresponding ports adjacent said blades and towards said outer drum. In this manner, the material zig-zags in the annular chamber 12 in and out of the ports and between the two refrigerated drums 10 and 11, so that it is efficiently and uniformly refrigerated and effectively agitated and worked. In case the machine is a continuous freezer, this material as it zig-zags circumferentially in the annular space 12 is simultaneously moved by its pressure lengthwise of the apparatus to a suitable outlet as will be further described. During this flow lengthwise of the apparatus, the material is not short circuited along a path between the two refrigerated surfaces, but passes as described through the ports, which offer the least resistance to the flow of said material. The invention is also adaptable for uses in batch freezers.

Although the inner blades 15 do not extend across their corresponding circumferential webs 18 and 19, the staggering of circumferentially alternate webs causes the inner blades of one longitudinal set to overlap the inner blades of the other longitudinal set. In this manner, although one set of inner blades 15 does not scrape the material at the region of the inner drum 10 opposite its corresponding webs 18 and 19, the other diametrically opposite set of inner blades 15 will pass over said region and scrape the material therefrom, so that the entire periphery of said inner drum is scraped during each revolution of the shaft 13.

In a similar manner, the overlapping of the outer blades 14 of the two longitudinal sets prevents accumulation of unscraped material on the surface of the outer drum 11 opposite the portion of the webs 18 and 19 between the adjacent ends of said blades.

The staggering of the ports as described prevents collection of material between the circumferential webs 18 and 19 and the two drums 10 and 11, since the area closed by one web is opened by a circumferentially succeeding alternate port.

Figs. 5 to 9 show the broad idea of the invention of Figs. 1 to 4 as applied to a commercial form of machine, in which the ported agitator shaft 13a is built to more effectively withstand the torsion stresses thereof to which it is subjected during rotation thereof. In this construction, the agitator shaft 13a comprises two diametrically opposed inner circular arc sections 41 and 42, and two diametrically opposed outer circular arc sections 43 and 44, overlapping said inner sections at their sides as shown in Fig. 7, and rigidly secured thereto by any suitable means as for instance welding at 45 to form a rigid tubular unit. The inner arc section 41 is provided with a series of rectangular notches 46 along one side thereof, three of these being shown separated by webs 47, and the other inner arc section 42 is provided along one side with a corresponding number of rectangular notches 48, staggered with respect to the notches 46 and separated by webs 49. Similarly, the outer arc sections 43 and 44 are provided with rectangular notches 50 and 51 respectively staggered with respect to each other, the notches 50 being separated by webs 52 and the notches 51 by webs 53.

The notches 46, 48, 50 and 51 are dimensioned to form ports in the shaft 13a, corresponding and similar to the ports in the construction of Figs. 1 to 4, and similarly arranged with the ports of the longitudinal rows staggered with respect to the ports of the alternate rows.

The outer scraper blades 14a have rounded bases seated in longitudinal V-shaped grooves 55 in the unnotched edges of the outer shaft sections 43 and 44, to permit said blades to swing outwardly in said grooves and into scraping engagement with the refrigerated surface of the outer drum 11 by the action of leaf springs 56, and are retained against circumferential displacement by pins 57 fixed to the webs 47 and 49 of the inner shaft sections 41 and 42, and extending loosely through holes in said blades 14a.

The inner scraper blades 15a are narrower than the scraper blades 14a, but are similarly retained in V-shaped seats 59 in the unnotched longitudinal edges of the inner shaft sections 41 and 42, and similarly urged against the refrigerated surface of the inner drum 10 by leaf springs 60, and are retained against circumferential displacement by pins 61 fixed to the webs 52 and 53 and extending loosely into said blades.

The shaft 13a has secured at one end thereof as by welding a head plate 70, provided with a plurality of outlets 71. A solid shaft 72 secured to this head plate 70 as for instance by welding serves to transmit the drive power to the shaft 13a. At the other end, the shaft 13a is internally lined with suitable anti-friction metal 73 such as Babbitt metal for bearing purposes.

Fig. 9 shows the application of the ported agitator shaft of the present invention to a continuous freezer. In this construction, one end of the freezer is closed by a plate 75, having inlet openings 76 through which the material to be processed is delivered into the processing chamber 12. This plate 75 also has an inlet opening 77 near its lower side for delivering a suitable refrigerant such as ammonia into the inner drum 10, and an outlet 78 near the upper side of said plate for said refrigerant. In the interior of the refrigerated drum 10 is a hollow member 80 having a circular portion 81 to confine the passage of the refrigerant close to the peripheral wall of said drum, and having a channel 83 on its upper side tapering downwardly towards the outlet 78 to facilitate gravitational flow of the liquid or condensed refrigerant towards said outlet 78.

The outer drum 11 is jacketed with a cylinder 85, which forms an annular space 86 with said drum for the refrigerant such as ammonia, and which is desirably covered with suitable heat insulating material 87. The space 86 has an inlet 88 near its middle, and two outlets 89 respectively adjacent its opposite ends for the refrigerant.

By means of this arrangement when the refrigerating apparatus is not operating in a flooded condition, inlet 88 may have liquid refrigerant supplied thereto preferably at such a point as to cause the cold liquid refrigerant to fall first upon the uppermost side of the drum 11 and then to drain downwardly around the sides of the drum. At the same time the liquid and gaseous refrigerant flows toward both ends of the apparatus toward the two outlets 89 in such a path as will chill the drum 11 in a uniform manner.

Heretofore, it has been found that in a refrigerating apparatus of this type wherein a revolving shaft with scrapers requiring a very small clearance is used, much less operating difficulties are encountered when the apparatus is disposed vertically than when disposed horizontally due to the fact that the contraction of a vertical cylinder in contact with cold refrigerant results in a uniform distortion whereas a horizontal cylinder undergoes a non-uniform distortion.

By means of the central inlet for the refrigerant and the two outlets near the ends of the horizontal cylinder it is now found that much less distortion due to temperature differentials results and that a more satisfactory operation of the working parts of the structure is obtained.

The ported agitator shaft 13a extending in the processing chamber 12 is journalled at one end on the inlet end of the inner drum 10, and at the other end of the drive shaft 72 affixed to said agitator shaft is journalled in anti-friction bearings 91, and is driven from a suitable source of power through a transmission including a pulley or gear 92 on said drive shaft 72.

A receiving chamber 94 communicates with the outlet end of the processing chamber 12 through the outlet openings 71 in the head plate, and has an outlet nozzle 95 for discharge of the processed material.

In the operation of the apparatus, the material to be processed is delivered under pressure into the left hand end of the processing chamber 12 (Fig. 9) through the inlets 76 and simultaneously at diametrically opposite sides of the ported shaft 13a, and is discharged at the other end at diametrically opposite sides of said shaft. The material during its passage through the processing chamber 12 increases in viscosity, but the provision of the drive at the outlet end of said shaft effectively resists the greater torsion of the shaft at this end resulting from this increased viscosity of the material. The hollow shaft construction is advantageous in providing the strength necessary to keep the blades in alignment without bending during the processing of the highly viscous material.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent is:

1. A refrigerating apparatus for plastic material comprising inner and outer refrigerated drums defining therebetween an annular chamber for the material to be refrigerated, a hollow shaft in said chamber encircling said inner drum, and having a pair of ports circumferentially spaced thereon, scrapers each having an edge abutting against the wall of said shaft within a corresponding one of said ports whereby the scraper may swing radially in respect to said wall and be readily removable therefrom, one of said scrapers being outside of said shaft for scraping the material from the refrigerated surface of the outer drum and directing it radially inwardly through the corresponding port toward the inner drum, and the other of said scrapers being inside of said shaft for scraping the material from the refrigerated surface of the inner drum and directing it radially outwardly through the corresponding port toward the outer drum.

2. A refrigerating apparatus for flowable material comprising inner and outer refrigerated drums defining therebetween an annular chamber for the material to be refrigerated, a hollow shaft in said chamber encircling said inner drum, having a plurality of ports through said shaft, the ports being arranged in rows lengthwise of the shaft and said rows being circumferentially spaced thereon, and scrapers mounted on said shaft adjacent to each of said rows for scraping the material from the refrigerated surfaces of said drums and directing it through the adjacent ports, each of said scrapers being relatively movable in respect to said shaft.

3. A refrigerating apparatus for flowable material comprising inner and outer refrigerated drums defining therebetween an annular chamber for the material to be refrigerated, a hollow shaft in said chamber encircling said inner drum, and having a plurality of ports circumferentially spaced thereon, and scrapers separate from and loosely mounted on said shaft adjacent to said ports for scraping the material from the refrigerated surfaces of said drums and directing it through the adjacent ports.

4. A refrigerating apparatus for plastic material comprising inner and outer refrigerated drums defining therebetween an annular chamber for the material to be refrigerated, a hollow shaft in said chamber encircling said inner drum and having four rows of ports through the wall of said shaft, said ports being arranged in rows lengthwise of the shaft and said rows being circumferentially spaced thereon, a pair of scrapers mounted substantially diametrically on said shaft adjacent to alternate rows of ports respectively for scraping the material from the refrigerated surface of the outer drum, and directing it radially inwardly through said latter ports towards the inner drum, and a second pair of scrapers mounted substantially diametrically on said shaft adjacent to the other two rows of ports respectively for scraping the material from the refrigerated surface of said inner drum, and directing it radially outwardly through said latter ports towards the outer drum, the ports of two adjacent rows being similarly spaced and positioned and the ports of the other two rows being offset axially in respect to the ports of the two first mentioned rows.

5. A refrigerating apparatus for plastic material comprising inner and outer refrigerated drums defining therebetween an annular chamber for the material to be refrigerated, a hollow shaft in said chamber encircling said inner drum, and having a plurality of circumferentially spaced rows of ports extending lengthwise of said shaft, the ports of one pair of adjacent rows being staggered with respect to the ports of the next successive pair of adjacent rows, means on said shaft adjacent to one row of ports of each pair for scraping the material from the refrigerated surface of the outer drum, and directing it radially inwardly through the ports of said latter row towards the inner drum, and means mounted on said shaft adjacent to the other port row of each pair for scraping the material from the refrigerated surface of said inner drum, and directing it radially outwardly through the ports of said latter row towards the outer drum.

6. A refrigerating apparatus for flowable material comprising inner and outer refrigerated drums defining therebetween an annular chamber for the material to be refrigerated, a hollow shaft in said chamber encircling said inner drum, and having four circumferentially spaced rows of ports extending lengthwise of said shaft, the ports of two alternate rows being staggered with respect to the ports of the other two rows, said ports serving as passageways for the zig-zag movement of the material between the refrigerated surfaces of said drums, and means for scraping the material from said surfaces as said shaft rotates.

7. A refrigerating apparatus for flowable material comprising inner and outer refrigerated drums defining therebetween an annular chamber for the material to be refrigerated, a hollow shaft in said chamber encircling said inner drum, and having four circumferentially spaced rows of ports extending lengthwise of said shaft, the ports of two alternate rows being staggered with respect to the ports of the other two rows, a pair of scrapers mounted substantially diametrically on said shaft adjacent to alternate port rows respectively for scraping the material from the refrigerated surface of the outer drum, and directing it radially inwardly through the ports of said latter rows towards the inner drum, a second pair of scrapers mounted substantially diametrically of said shaft adjacent to the other two port rows respectively for scraping the material from the refrigerated surface of said inner drum, and directing it radially outwardly through the ports of said latter rows towards the outer drum.

8. A refrigerating apparatus for flowable material comprising inner and outer refrigerated drums defining therebetween an annular chamber for the material to be refrigerated, a hollow shaft in said chamber made of one piece and encircling said inner drum, said shaft having ports through which the material flows between the two refrigerated surfaces of said drum as the shaft rotates, and scraper means carried on, relatively movable in respect to, and readily removable from said shaft for scraping the material from said refrigerated surfaces as said shaft rotates.

9. A refrigerating apparatus for flowable material comprising inner and outer refrigerated drums defining therebetween an annular chamber for the material to be refrigerated, a hollow shaft in said chamber encircling said inner drum, and comprising a plurality of circular arc sections mounted in overlapping relationship and secured together to form a rigid tubular unit, said sections having recesses defining ports through which the material flows between the two refrigerated surfaces of said drum as said shaft rotates, and rotatable scraper means for scraping the material from said refrigerated surfaces.

10. A refrigerating apparatus for flowable material comprising inner and outer refrigerated drums defining therebetween an annular chamber for the material to be refrigerated, a hollow shaft in said chamber encircling said inner drum, and comprising a plurality of circular arc sections mounted in overlapping relationship and secured together to form a rigid tubular unit, said sections having recesses defining ports through which the material flows between the two refrigerated surfaces of said drums as the shaft rotates, some of said sections having recesses along their longitudinal edges, and scraper blades seated in said last mentioned recesses for scraping the material from said refrigerated surfaces as said shaft rotates.

11. A continuous freezer for flowable material comprising inner and outer refrigerated drums defining therebetween an annular chamber for the material to be refrigerated, an inlet and outlet for said chamber, a hollow shaft in said chamber encircling said inner drum, and having ports through which the material flows between the refrigerated surfaces as the shaft rotates, and means carried by said shaft for scraping the material from the refrigerated surfaces of said drums as said shaft rotates.

12. A continuous freezer for flowable material comprising inner and outer refrigerated drums defining therebetween an annular chamber for the material to be refrigerated, an inlet at one end of said chamber and an outlet at the other end for the material to be refrigerated, a hollow shaft in said chamber encircling said inner drum, and having ports through which the material flows between the two refrigerated surfaces as the shaft rotates, a drive shaft secured to said hollow shaft at the outlet end of said chamber, and scraper means carried on said shaft for scraping the material from the refrigerated surfaces of said drums as said shaft rotates.

13. In a refrigerating apparatus, the combination comprising a cylindrical drum, a hollow member in said drum extending substantially the full length thereof, and having a channel along one side and a circular section along its remaining side, the peripheral wall of said member being spaced from the peripheral wall of said drum to form a passageway, and said drum having a refrigerant inlet and outlet at one end for said passageway, said outlet being in alignment wtih one end of said channel.

14. In a refrigerating apparatus, the combination comprising a substantially horizontal cylindrical drum, a hollow member in said drum extending substantially the full length thereof, and having a longitudinal channel along its upper side, and a circular section along its remaining side, the peripheral wall of said member being spaced from the peripheral wall of said drum to form a passageway, and said drum having a refrigerant inlet and outlet at one end for said passageway, said outlet being at the upper side of said drum in communication with one end of said channel, and said inlet being at the lower side of said drum, said channel having its cross-sectional area progressively increased towards its outlet end.

15. An apparatus as recited in claim 14, characterized in that the longitudinal base of the channel inclines downwardly towards the outlet to provide for the gravitational flow of the refrigerant towards said outlet.

16. In a refrigerating apparatus, the combination including a horizontally disposed cylindrical casing, a path for refrigerant along the outer wall of said casing and including a refrigerant inlet disposed adjacent the middle thereof and refrigerant outlets disposed adjacent the two ends thereof, a second cylindrical casing disposed concentrically within said first casing and forming an annular space therebetween through which material to be cooled may be passed, a refrigerant inlet and outlet connected to the interior of said second casing, and rotatable means located within said annular space.

BRUCE DE HAVEN MILLER.
HENRY W. BEVARLY.